(12) United States Patent
Servant et al.

(10) Patent No.: US 9,169,069 B2
(45) Date of Patent: Oct. 27, 2015

(54) MOBILE CARRIAGE SYSTEM WITH NO RAILS FOR GUIDANCE SYSTEM

(71) Applicant: Spacesaver Corporation, Fort Atkinson, WI (US)

(72) Inventors: Matthew O. Servant, Roscoe, IL (US); Brian Patrick Bourke, Jefferson, WI (US); Eric James Wipperfurth, Fort Atkinson, WI (US); Steven Mark Lehmann, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 26 days.

(21) Appl. No.: 13/849,076

(22) Filed: Mar. 22, 2013

(65) Prior Publication Data

US 2013/0261926 A1    Oct. 3, 2013

Related U.S. Application Data

(60) Provisional application No. 61/617,266, filed on Mar. 29, 2012.

(51) Int. Cl.
| | | |
|---|---|---|
| *G06F 19/00* | (2011.01) | |
| *B65G 1/04* | (2006.01) | |
| *B65G 1/10* | (2006.01) | |

(52) U.S. Cl.
CPC ... *B65G 1/04* (2013.01); *B65G 1/10* (2013.01)

(58) Field of Classification Search
CPC .......... B65G 1/04; G06Q 50/22; B07C 7/005; Y10S 219/93; A61B 19/0248; A61B 19/0287
USPC .............. 701/1, 23, 27, 69, 99; 312/201, 301, 312/298; 104/307; 250/221, 222.1; 414/255, 800

See application file for complete search history.

(56) References Cited

U.S. PATENT DOCUMENTS

| | | | | |
|---|---|---|---|---|
| 5,569,910 | A * | 10/1996 | Griesemer | .................... 250/221 |
| 5,861,836 | A | 1/1999 | Hoss | |
| 5,961,559 | A * | 10/1999 | Shimbara et al. | ............... 701/23 |
| 5,995,883 | A | 11/1999 | Nishikado | |
| 6,179,080 | B1 | 1/2001 | Kikuchi | |
| 6,507,777 | B1 | 1/2003 | Pinlam et al. | |
| 6,971,464 | B2 * | 12/2005 | Marino et al. | ................ 180/167 |
| 7,829,838 | B2 | 11/2010 | Haubenschild et al. | |
| 2007/0296265 | A1 * | 12/2007 | Bourke et al. | ..................... 303/3 |
| 2008/0199298 | A1 * | 8/2008 | Chilson et al. | ................ 414/809 |
| 2008/0303387 | A1 * | 12/2008 | Haubenschild et al. | ...... 312/201 |
| 2012/0251276 | A1 * | 10/2012 | Rathbun et al. | ............... 414/255 |

\* cited by examiner

*Primary Examiner* — Helal A Algahaim
*Assistant Examiner* — Shardul Patel
(74) *Attorney, Agent, or Firm* — Andrus Intellectual Property Law, LLP

(57) ABSTRACT

A mobile storage system that includes a guidance system controlling the movement of each of a plurality of movable carriages along a support surface. The mobile storage system includes a guidance system having a magnetic strip positioned on the support surface. One or more magnetic sensors are positioned on each of the mobile carriages and generally aligned with the magnetic strip positioned on the floor. The magnetic sensors detect the magnetic strip and a control unit controls the operation of a pair of drive motors to move the carriages along, the mobile strip while maintaining proper alignment. The guidance system thus eliminates the need for any floor mounted rails to guide the movement of the individual mobile carriages along the support surface.

12 Claims, 7 Drawing Sheets

MOBILE CARRIAGE SYSTEM WITH NO RAILS FOR GUIDANCE SYSTEM

CROSS-REFERENCE TO RELATED APPLICATION

The present application is based on and claims priority to U.S. Provisional Patent Application Ser. No. 61/617,266 filed Mar. 29, 2012.

BACKGROUND

The present disclosure generally relates to storage systems and more specifically, to a high density mobile storage system that includes a guidance system to selectively control the movement of the movable carriages to form an aisle between adjacent carriages.

Industrial and commercial rack and shelving systems are commonly used in storage facilities to store products until those products are shipped to a customer or to a retailer. Typically, the storage racks include multiple shelves that store loaded pallets of other types of items. The stored items can be removed from the storage racks when needed. The storage racks are spaced from one another in a manner to form relatively wide aisles to allow sufficient room for a forklift or other vehicle to remove items from the storage racks. Since each storage rack has a fixed position, each rack or shelving unit must have a dedicated aisle. Since an aisle is typically as wide as the rack itself, more than half of the floor space occupied by an industrial or commercial rack or shelving system may be occupied by aisles and is thus not usable for product storage.

Mobile shelving or rack systems, such as those available from Spacesaver Corporation, are designed to reduce the number of fixed aisles and, as a result, increase the amount of floor space used for product storage. Typically, a single aisle is allocated for the entire shelving or rack system. The position of the single aisle can be changed by moving the carriages supporting the individual racks or shelves along a track or rail that is mounted within the storage facility flooring, which is typically a concrete slab. During use, each of the individual racks can be moved either separately or as a multiple rack unit to create an aisle between desired storage racks. In typical mobile shelving or rack systems, rails or guides are mounted within the concrete floor in a parallel arrangement to guide the individual movable carriages during the movement process.

During the initial construction of a storage facility, the rails or guides are typically positioned in the floor as the floor is poured. In this manner, the rails can be set out in the desired location and can be embedded in the floor during the floor creation.

When a mobile shelving or rack system is desired in a pre-existing storage facility, the guide rails must be positioned within the floor in the desired location. This process requires cutting of the concrete floor and positioning the rails within the removed channels. Once the rails have been recessed into the floor, additional concrete material is poured along the rails to secure the rails in the desired location. Retrofitting existing storage facilities to include a mobile industrial rack system is thus both costly and time consuming.

SUMMARY

The present disclosure relates to a mobile storage system that includes a guidance system for controlling the movement of each of the plurality of movable carriages. The guidance system does not include any in-floor mounted rails or guides. Instead, the guidance system includes a magnetic strip that is surface mounted to the floor of the storage facility to guide the movement of each carriage of the mobile storage system.

The guidance system is made up of a magnetic strip, two magnetic sensors per carriage, a minimum of two motors per carriage, a motor control unit and two distance sensors per aisle. The magnetic strip is fixed to the floor and defines the path of travel for each of the carriages. The carriages are centered above the magnetic strip such that a pair of magnetic sensors on each carriage detect the presence of the magnetic strip.

The magnetic sensors each provide a signal to the control unit. Based upon the readings from the magnetic sensors, the control unit applies the proper power to the motors to effectively steer the carriage and allow the carriage to follow the path of the magnetic strip.

The guidance system further includes a pair of distance sensors that are positioned to continuously measure the distance between the sensor and a target that is mounted on the adjacent movable carriage or in a stationary position. The information from the distance sensors is used by the control unit to slow down or speed up the motors to provide the proper spacing between carriages as well as square and smooth movement of the carriages.

Although the magnetic sensors are sufficient to keep the carriages centered about the magnetic strip, the magnetic sensors do not have infinite resolution. Therefore, the guidance system includes distance sensors in the front and/or rear of the carriage to provide the control unit with the information needed to make fine motor adjustment to keep the opposite ends of each carriage in alignment. When the carriage approaches the end of travel, the information received at the control unit from the distance sensors are used to make alignment corrections and bring the carriage to a smooth stop.

In accordance with the present disclosure, metal guides or rails are no longer required to be mounted within the floor, which greatly reduces installation time and improves ease of system relocation. The type and size of wheels, motors and other drive components are selected based upon the rolling surface and carriage load to keep the surface the wheels are rolling on structurally sound, minimize floor wear at wheel contact points, and provide sufficient power to move the load.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
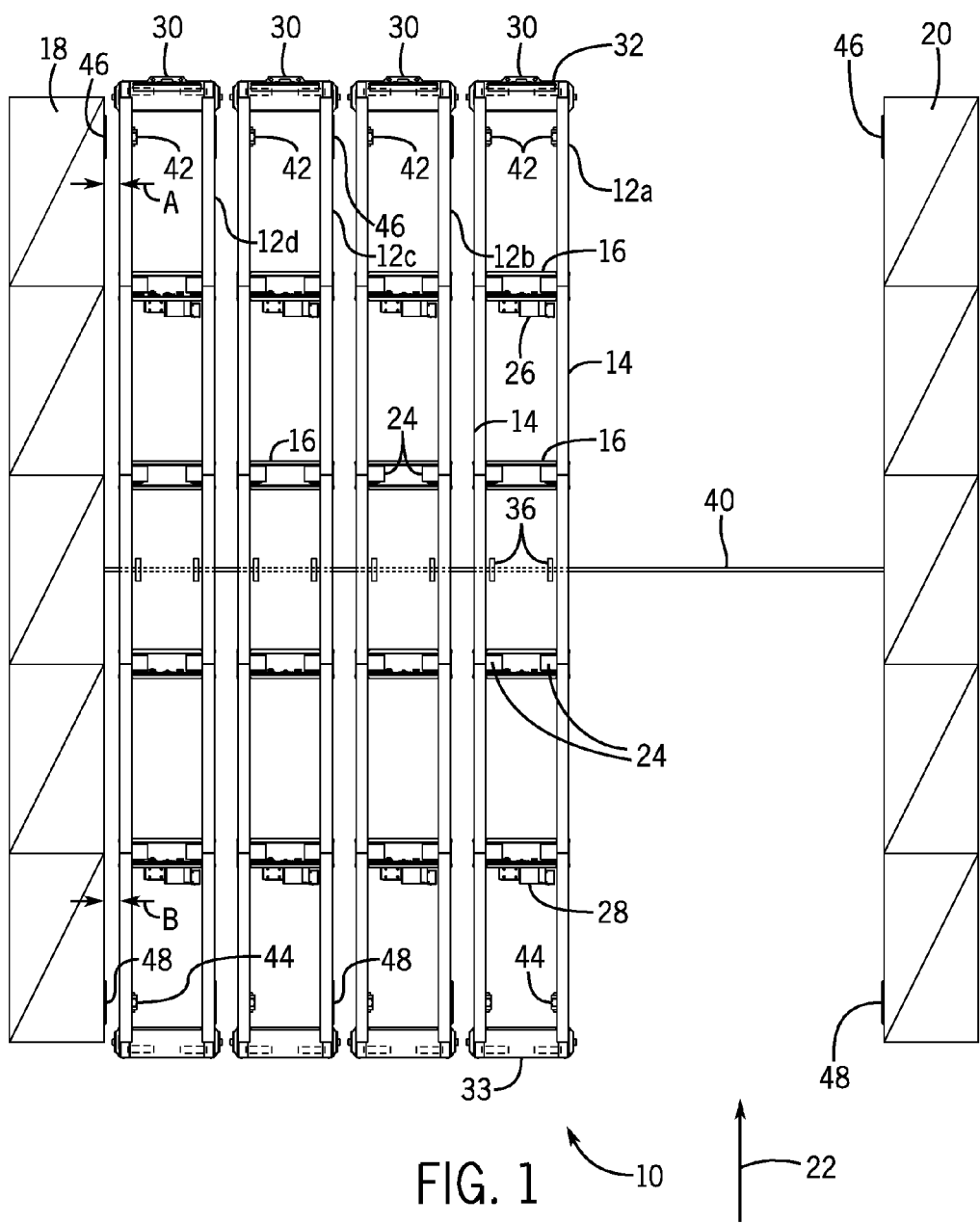
FIG. 1 is a schematic illustration of a mobile storage system having series of movable carriages that are movable to selectively create an aisle between adjacent carriages.

FIG. 1 illustrates a mobile storage system 10 constructed in accordance with the present disclosure. The mobile storage system 10 includes a plurality of movable carriages 12 that each support a series of shelves, racks or pallets (not shown). Each of the mobile carriages 12 generally includes a pan of spaced side frames 14 that are interconnected to each other by a plurality of cross frames 16. The cross frames 16 provide the required stability and rigidity for the mobile carriage 12.

In the configuration shown in FIG. 1, the mobile storage system 10 includes a first static shelving unit 18 and a second static shelving unit 20. The first and second static shelving units 18, 20 are stationary and define the outer ends of the mobile storage system 10. Although static shelving units 18, 20 are shown in FIG. 1, these units could be eliminated and other methods used to determine the end of travel of the movable carriages 12a and 12d. In the embodiment shown in FIG. 1, four mobile carriages 12a, 12b, 12c and 12d are illustrated as being, movable between the static shelving units 18, 20. However, it should be understood that a different number of movable carriages 12 could be utilized while operating within the scope of the present disclosure.

In the embodiment shown in FIG. 1, an aisle 22 is formed between the first movable carriage 12a and the second static shelving unit 20. As is conventional, the movable carriage 12a can be moved toward the second static shelving unit 20 to create an aisle between the first movable carriage 12a and the second movable carriage 12b.

As illustrated in FIG. 1, each of the movable carriages 12 includes multiple pairs of support wheels 24 mounted for rotation within each of the cross frames 16. The support wheels 24 provide the required support for the movable carriage 12 on the support surface. Since the mobile storage system 10 is typically positioned on a generally level floor, the support wheels 24 allow each of the individual movable carriages 12 to freely move along the floor.

Figure 6:
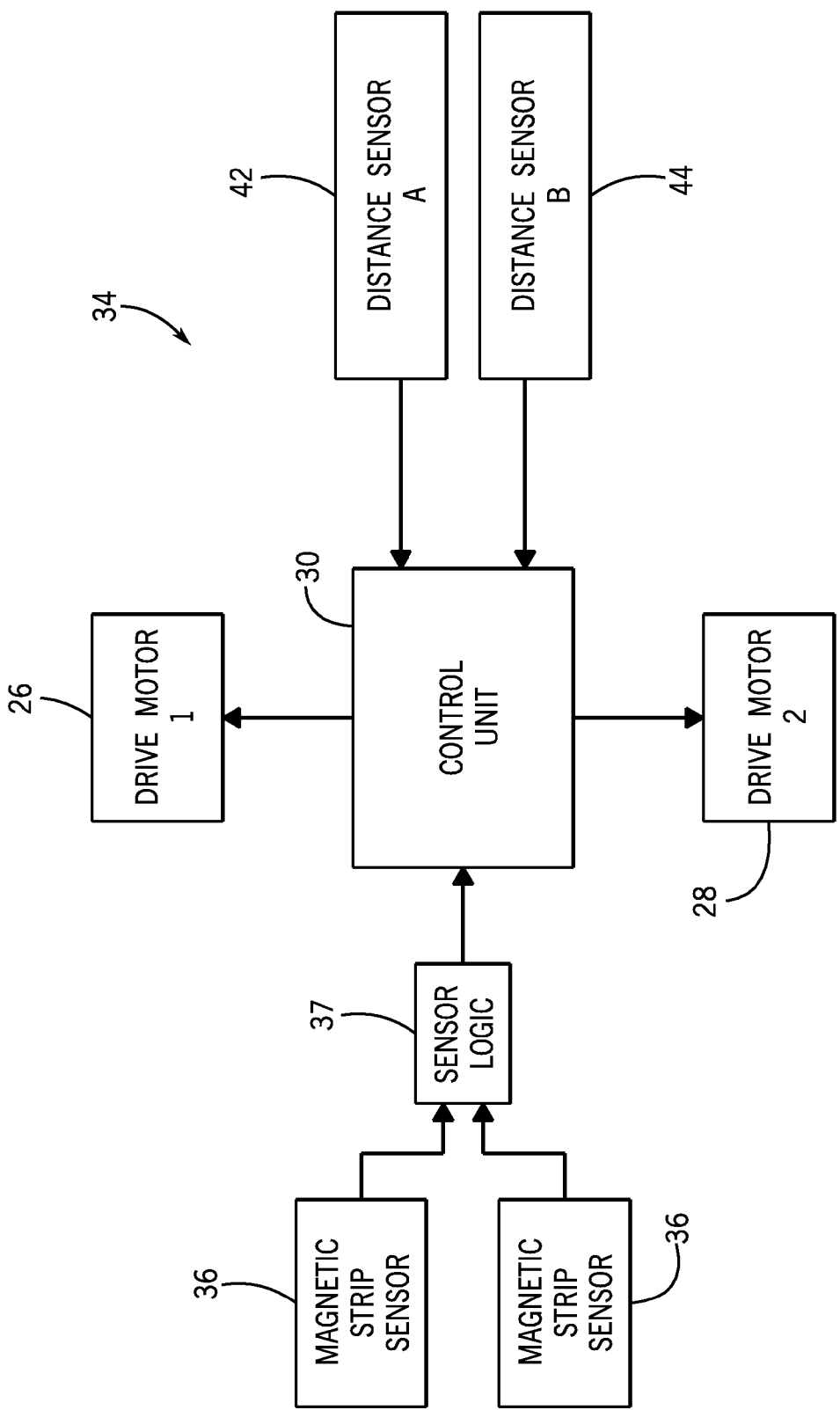
FIG. 6 is a schematic illustration of the control unit of each movable carriage to control the operation thereof.

Each of the mobile carriages 12 includes a first drive motor 26 and a second drive motor 28. The first and second drive motors 26, 28 combine to move the movable carriage 12 in either direction. As illustrated in FIG. 6, each of the first and second drive motors 26, 28 are in connection with a control unit 30. The control unit 30 independently controls the operation of both of the chive motors 26, 28 to control the movement of the carriage 12 in either direction.

Each of the drive motors 26, 28 are independently operable by the control unit 30. Since the length of each mobile carriage 12 may be up to 90 feet or more, if the operation of the drive motors 26, 28 are not coordinated, the mobile carriage 12 can become skewed relative to the stationary static shelving units 18, 20.

In prior art mobile storage systems, guide rails are embedded in the floor of the storage facility to prevent the opposite ends 32, 33 of each mobile carriage 12 from becoming skewed relative to each other. However, as previously indicated, floor mounted guides or rails are difficult to position when the mobile storage system 10 is being installed into an existing storage facility.

FIG. 6 schematically illustrates part of a guidance system 34 for the mobile storage system 10 of the present disclosure. The guidance system 34 shown in FIG. 6 is used to control the movement and orientation of each of the individual mobile carriages 12. Each of the mobile carriages 12 includes its own control unit 30 that is mounted at the first end 32 of the mobile carriage 12. The guidance system 34 includes a pair of magnetic strip sensors 36 that communicate to the control unit 30 through a sensor logic unit 37. The sensor logic unit 37 processes the raw signals from the magnetic strip sensors 36 to provide a distance measurement such that the control unit 30 can interpret and act on the signal from the logic unit 37.

Although the embodiment shown in the Figures includes a control unit 30 positioned on each of the mobile carriages 12, it is contemplated that a single control unit could be utilized while operating within the scope of the present disclosure. In an embodiment including only a single control unit, the control unit would be in communication with the drive motors, distance sensors and magnetic sensors of each of the individual mobile carriages. The single control unit could then issue directions and control signals to each of the individual mobile carriages based upon the distance measurements and magnetic sensor signals received from each of the mobile carriages. Alternatively, in a system that includes multiple control units 30, as shown in the drawing Figures, it is contemplated that each of the control units 30 can communicate with each other to relay operating information and signals between each of the control units to better control and operate the series of mobile carriages 12.

Figure 2:
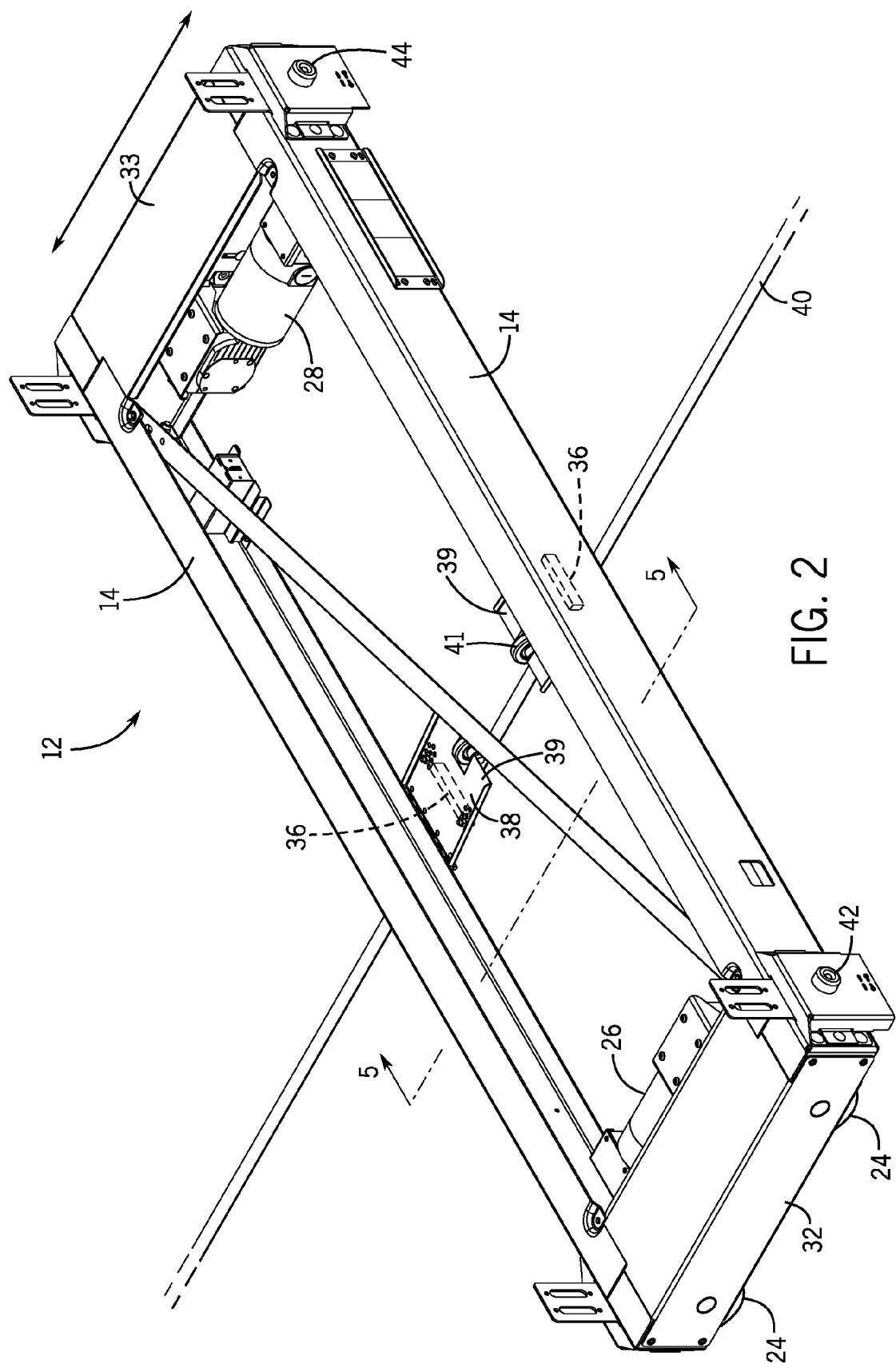
FIG. 2 is a perspective view illustrating the guidance system of the present disclosure.

As illustrated in FIG. 2, each of the magnetic strip sensors 36 is mounted to a hinged plate 38 that is supported at its outer, free end 39 by a wheel 41. The wheel 41 supports the free end 39 of the hinged plate 38 to maintain a constant distance between the magnetic strip sensor 36 and the floor.

Each of the magnetic position sensors 36 is operable to sense a magnetic ship 40 that is attached to the floor of the storage facility. The magnetic strip 40 can be attached to the floor of the storage facility utilizing any conventional attachment techniques, such as screws, bolts, adhesive or any other type of method that can hold the magnetic strip securely in place along the floor to define a movement path for each of the individual mobile carriages. Preferably, the magnetic strip is formed from a metallic material that is magnetized and can be sensed by the magnetic sensors 36.

The magnetic strip sensors 36 each generate a signal that is received by the sensor logic unit 37, which interprets the signals from the sensors 36 and provides a distance measurement to the control unit 30. The magnetic strip sensors 36 generate a voltage signal that is proportional to the distance the center of the magnetic strip sensor 36 is moved relative to the centerline of the magnetic strip 40. An example of a magnetic strip sensor is the SPS-L075-HALS sensor available from Honeywell, although other similar sensors could be used while operating within the scope of the present disclosure. Although a pair of magnetic sensors 36 is shown, a single magnetic sensor 36 could be used to sense the magnetic strip 40 while operating within the scope of the present disclosure. The output signal of each magnetic strip sensor is a 5-volt DC output voltage that is proportional to the distance the center of the magnetic sensor moves from the center axis of the magnetic strip 40.

Referring now to FIG. 6, the output from each of the magnetic strip sensors 36 is received by the control unit 30. If the control unit 30 determines that the carriage is moving away from the centerline of the magnetic strip, the control unit can selectively activate either the first drive motor 26 or the second drive motor 28 to control the orientation of the carriage. Based upon the continuous readings from the magnetic strip sensors 36, the control unit 30 can effectively steer the mobile carriage to allow the carriage to follow the movement path defined by the magnetic strip 40. As can be understood in FIG. 2, the magnetic strip 40 can be positioned and secured along the floor of a storage facility to define the path of movement of each of the mobile carriages 12.

Figure 3:
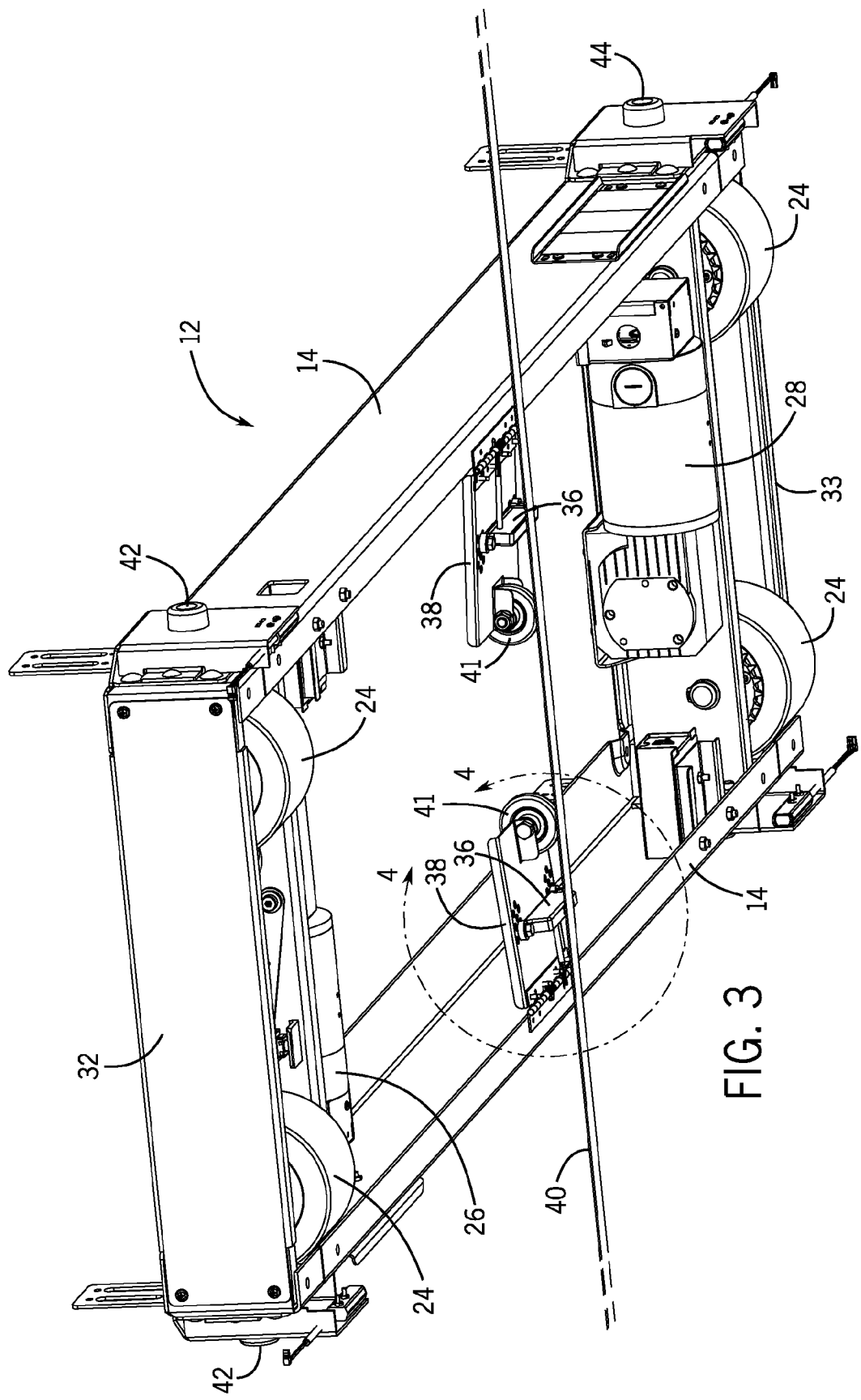
FIG. 3 is a bottom perspective view illustrating the position of the magnetic sensors relative to the magnetic strip mounted to the floor of a storage facility.
Figure 4:
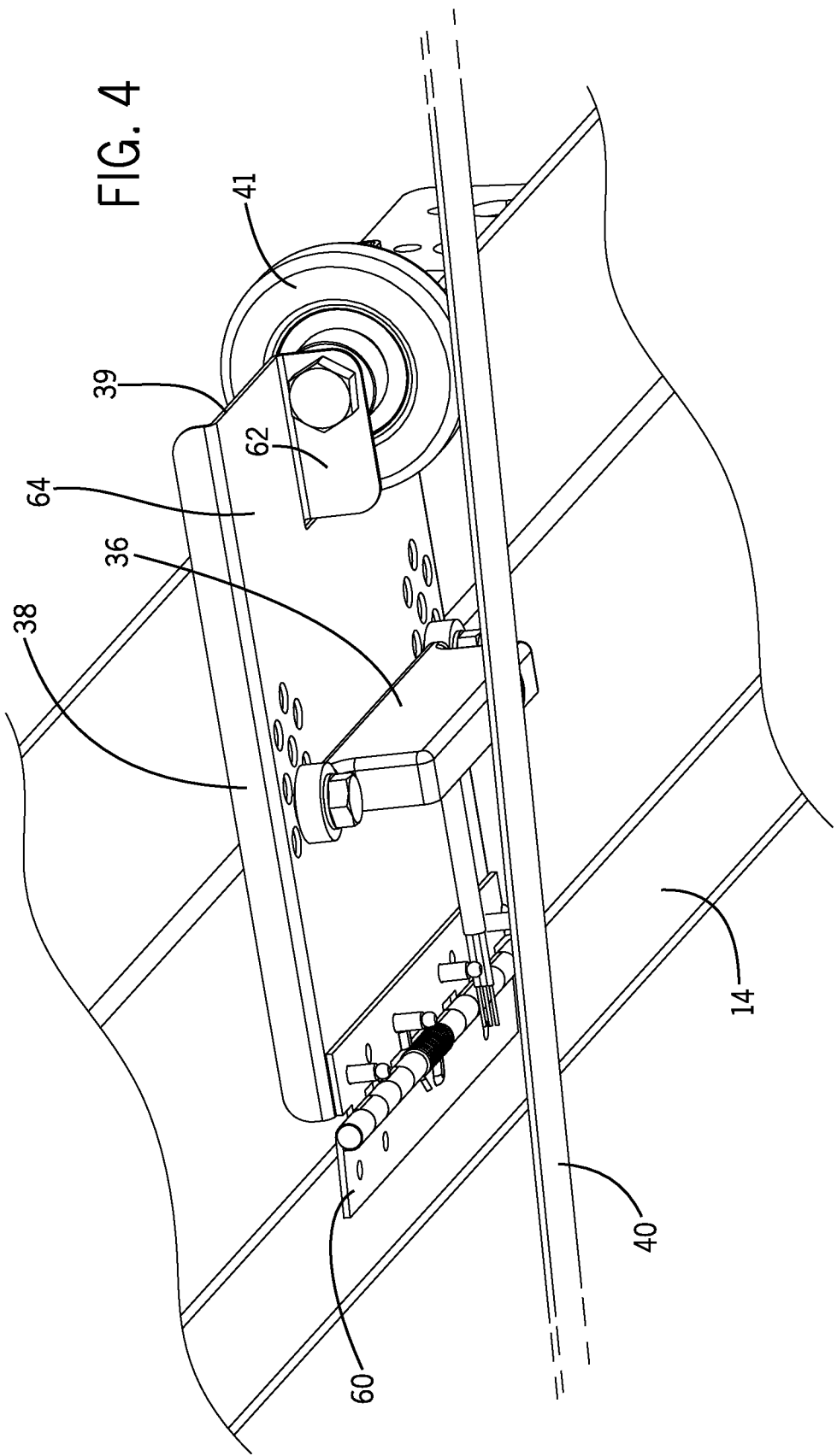
FIG. 4 is a magnified view of the magnetic sensor mounting arrangement of the present disclosure.
Figure 5:
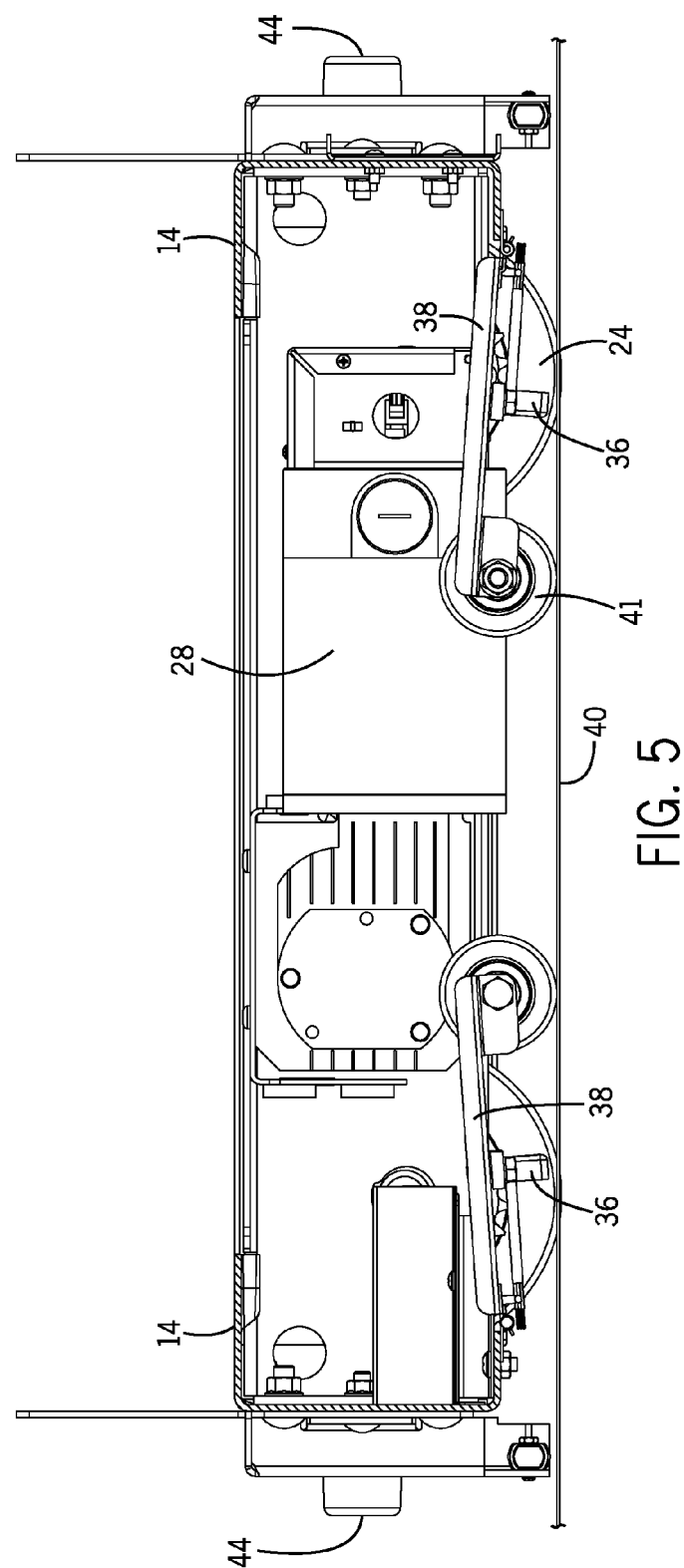
FIG. 5 is a section view taken along line 5-5 of FIG. 2 illustrating the support and mounting of the magnetic sensors along the movable carriage.

FIGS. 3-5 illustrate the specific mounting arrangement for the magnetic sensor 36 along the movable carriage 12. As can best be seen in FIG. 4, the hinged plate 38 is connected to the side frame 14 by a spring biased hinge 60. The spring biased hinge 60 allows the outer end 39 of the hinged plate 38 to move as the movable carriage is moved along the support surface. The outer end 39 includes a support flange 62 that rotatably supports the wheel 41. As illustrated in FIG. 4, the wheel 41 is generally aligned over the magnetic strip 40 and rides along the magnetic strip 40 when the movable carriage is correctly centered along the magnetic strip.

The magnetic strip sensor 36 is securely mounted to a bottom surface 64 of the hinged plate 38. As illustrated in FIG. 5, the magnetic sensor 36 is positioned slightly above the magnetic strip 40 as the carriage moves along the floor.

Although one specific example of the mounting arrangement for the magnetic sensor is shown in the drawing Figures, it should be understood that other types of mounting arrangements could be utilized that support the magnetic sensor 36 above, the magnetic strip 40 such that the magnetic sensor 36 can generate measurement signals upon movement of the carriage about the magnetic strip 40.

Although the use of the magnetic strip sensors 36 and the magnetic strip 40 allow the control unit 30 to keep each of the carriages 12 generally centered over the magnetic strip 40, the guidance system of the present disclosure further includes a first distance sensor 42 and a second distance sensor 44 at the first end 32 and the second end 33 of the carriage. The first distance sensor 42 of carriage 12a is positioned to detect a first target 46 mounted to the static shelving unit 20. Likewise, the second distance sensor 44 on the mobile carriage 12a is positioned to detect a second target 48. The first distance sensor 42 determines a distance A between the first distance sensor 42 and the first target 46. Likewise, the second distance sensor 44 determines a distance B between the second distance sensor 44 and the second target 48. As illustrated in FIG. 6, the distances measured by the first and second distance sensors 42, 44 are fed to the control unit 30.

Since the first distance A and the second distance B should be approximately equal to maintain the proper orientation of the mobile carriage 12a, the control unit 30 provides custom motor control to the pair of drive motors 26, 28 to keep the distances A and B approximately the same. When the carriage 12a reaches its end of travel, the information from the distance sensors 42, 44 are used by the control unit 30 to bring the carriage to a smooth stop.

As illustrated in FIG. 1, each of the mobile carriages 12 includes a first distance sensor 42 and a second distance sensor 44. The rightmost carriage 12a includes a pair of first distance sensors 42 and a pair of second distance sensors 44 such that the control unit can determine the distance from the mobile carriage to either the second static shelving unit 20 or the second carriage 12b. The remaining mobile carriages 12 only require a single set of first and second distance sensors 42, 44, as illustrated.

In the embodiment illustrated in the drawing Figures, the first and second distance sensors 42, 44 are infrared (IR) sensors that sense the distance between each of the sensors and the respective target 46, 48. Although this type of sensor is described as being the preferred embodiment, it should be understood that various different types of distance sensing devices could be utilized while operating within the scope of the present disclosure. It is also understood that although the first and second distance sensors 42 and 44, along with the respective targets 46 and 48 are shown, in certain configurations only one distance sensor is required to effectively guide the carriage.

Figure 7:
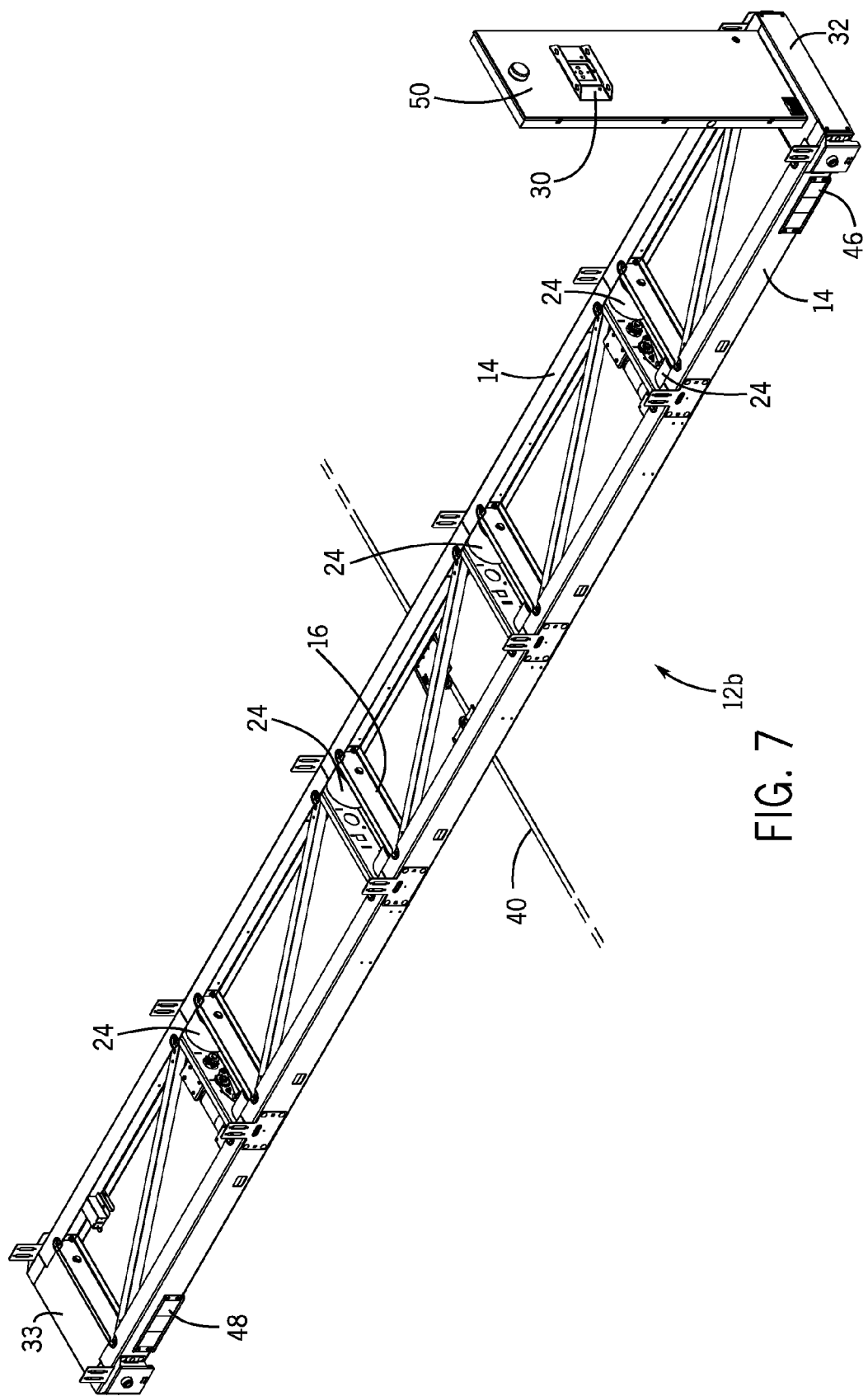
FIG. 7 is a perspective view illustrating one of the movable carriages including the guidance system and control unit of the present disclosure.

FIG. 7 illustrates one embodiment of a movable carriage 12 that utilizes the guidance system of the present disclosure. As illustrated in FIG. 7, the movable carriage 12 includes the control unit 30 mounted to a control panel 50. The control unit 30 includes a series of operational switches that allow a user to manually control the movement of the carriage 12. In the embodiment shown in FIG. 7, the pair of side frames 14 and cross frames 16 supports a series of pallets for movement along with the movable carriage. The magnetic strip 40 defines the passive movement of each of the carriages 12.

As illustrated in FIG. 7, the mobile carriage 12 includes multiple pairs of support wheels 24 spaced between the cross frames 16. In the embodiment illustrated, three pairs of wheels 24 are located on each side of the magnetic strip 40 such that the magnetic strip is centered within the overall length of the mobile carriage 12. FIG. 7 also illustrates the first and second targets 46, 48 that are each sensed by one of the first and second distance sensors 42, 44.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A mobile storage system for use along a support, surface devoid of any floor mounted guide rails, comprising: a plurality of movable carriages each having a first side frame and a second side frame and extending laterally between a first end and a second end, each mobile carriage including a first drive motor positioned near the first end of the mobile carriage and a second drive motor positioned near the second end of the mobile carriage, each movable carriage including a plurality of support wheels that support the carriage directly on the support surface; a control unit for controlling the movement of the mobile carriages along the support surface; and a guidance system in communication with the control unit to determine the position of the mobile carriage along the support surface as the mobile carriage moves along the support surface, wherein the guidance system includes a magnetic strip mounted to the support surface to define a movement path for the mobile carriages, a magnetic sensor located on each of the mobile carriages to detect the magnetic strip, a first distance sensor positioned at the first end of the mobile carriage and operable to detect a first distance from the first side frame to stationary target and a second distance sensor positioned at the second end of the mobile carriage and operable to detect a second distance from the first side frame to the stationary target; wherein each of the magnetic sensors are mounted to a support plate having a hinged first end and a movable second end such that the support plate pivots about the first end to maintain a generally constant distance between the magnetic sensor and the magnetic strip; and wherein the control unit controls the operation of the first and second drive motors to maintain the position of the mobile carriage along the magnetic strip based on a detection signal from the magnetic sensor and to maintain the orientation of the first end and the second end of the carriage by maintaining the first and second distances equal to each other.

2. The mobile storage system of claim 1 wherein each of the mobile carriages includes at least a pair of drive motors, wherein the control unit controls the operation of the pair of drive motors to control the movement of the mobile carriages.

3. The mobile storage system of claim 1 wherein the control unit guides each of the mobile carriages based upon a detection signal from the magnetic sensor such that the mobile carriages are guided along the movement path.

4. The mobile storage system of claim 3 wherein each of the mobile carriages includes a control unit.

5. The mobile storage system of claim 4 wherein each of the mobile carriages includes a pair of drive motors, wherein a first drive motor is positioned near a first end of the mobile carriage and a second drive motor is positioned near a second end of the mobile carriage, wherein the control unit selectively operates the first and second drive motors to move the mobile carriage along the movement path.

6. The mobile storage system of claim 1 wherein the support surface is devoid of any guide rails.

7. The mobile storage system of claim 1 wherein the guidance system includes at least one distance sensor.

8. The mobile storage system of claim 1 wherein the movable second end includes a support wheel that contacts the support surface.

9. A mobile storage system for use along a support surface devoid of any floor mounted guide rails, comprising: a plurality of mobile carriages each having a first side frame and a second side frame and extending laterally between a first end and a second end, each mobile carriage including a first drive motor positioned near the first end of the mobile carriage and a second drive motor positioned near the second end of the mobile carriage, each mobile carriage including a plurality of support wheels that support the carriage directly on the support surface; a control unit contained on each of the mobile carriages, wherein the control unit controls the operation of the first and second drive motors to selectively move the mobile carriage along the support surface; a guidance system in communication with the control unit, wherein the guidance system includes a magnetic strip mounted to the support surface, at least one magnetic sensor positioned on each of the mobile carriages and operable to detect the magnetic strip, a first distance sensor positioned at the first end of the mobile carriage and operable to detect a first distance from the first side frame to a stationary target and a second distance sensor positioned at the second end of the mobile carriage and operable to detect a second distance from the first side frame to the stationary target, wherein the control unit controls the operation of the first and second drive motors to maintain the position of the mobile carriage along the magnetic strip based on a detection signal from the magnetic sensor and to maintain the orientation of the first end and the second end of the carriage by maintaining the first and second distance equal to each other.

10. The mobile storage system of claim 9 wherein each of the magnetic sensors are mounted to a support plate having a hinged first end and a movable second end such that the support plate pivots about the first end to maintain a generally constant distance between the magnetic sensor and the magnetic strip.

11. A guidance system for use in a mobile storage system having a plurality of mobile carriages that are each movable along a support surface through operation of a first drive motor and a second drive motor mounted to each of the movable carriages, the guidance system comprising: a magnetic strip mounted to the support surface to define a movement path for each of the mobile carriages; at least one magnetic sensor mounted to each of the movable carriages to detect the magnetic strip; a first distance sensor positioned at a first end of each mobile carriage and a second distance sensor positioned at a second end of each mobile carriage, wherein the first distance sensor is operable to detect a first distance from a first side frame of the mobile carriage to a stationary target and the second distance sensor is operable to detect a second distance from the first side frame to the stationary target; and a control unit coupled to the magnetic sensor and the first and second distance sensors, wherein the control unit operates the first and second drive motors to move the carriage along the movement path, and wherein the control unit operates the first and second drive motors based upon distance measurements from the first and second distance sensors to maintain the first and second distances equal to each other.

12. The guidance system of claim 11 wherein each of the movable carriages includes a pair of magnetic sensors spaced along the width of each mobile carriage.

* * * * *